(12) United States Patent
Knebel et al.

(10) Patent No.: US 7,473,894 B2
(45) Date of Patent: *Jan. 6, 2009

(54) APPARATUS AND METHOD FOR A SCANNING PROBE MICROSCOPE

(75) Inventors: Detlef Knebel, Berlin (DE); Torsten Jähnke, Berlin (DE); Olaf Sünwoldt, Berlin (DE)

(73) Assignee: JPK Instruments AG, Berlin (DE)

( * ) Notice: Subject to any disclaimer, the term of this patent is extended or adjusted under 35 U.S.C. 154(b) by 400 days.

This patent is subject to a terminal disclaimer.

(21) Appl. No.: 11/378,258

(22) Filed: Mar. 20, 2006

(65) Prior Publication Data

US 2006/0168703 A1 Jul. 27, 2006

Related U.S. Application Data

(63) Continuation of application No. 10/490,442, filed as application No. PCT/DE02/03688 on Sep. 24, 2002, now Pat. No. 7,022,985.

(30) Foreign Application Priority Data

Sep. 24, 2001 (DE) .................. 101 47 868

(51) Int. Cl.
*G01N 23/00* (2006.01)
*G21K 7/00* (2006.01)

(52) U.S. Cl. ............... 250/306; 250/307; 250/423 R; 250/432 R; 250/201.3; 250/234; 977/868; 73/105; 73/866.5; 359/372; 359/375

(58) Field of Classification Search .......... 250/306, 250/307, 432 R, 423 R, 201.3, 234; 977/868; 73/105, 866.5; 359/372, 375
See application file for complete search history.

(56) References Cited

U.S. PATENT DOCUMENTS

| | | | | |
|---|---|---|---|---|
| 5,616,916 A | * | 4/1997 | Handa et al. | 250/234 |
| 6,032,518 A | * | 3/2000 | Prater et al. | 73/105 |
| 7,022,985 B2 | * | 4/2006 | Knebel et al. | 250/306 |
| 2005/0061970 A1 | | 3/2005 | Knebel et al. | |

FOREIGN PATENT DOCUMENTS

EP 0 564 088 A 10/1993

OTHER PUBLICATIONS

Werf Van Der. K. et al., "Compact Stand-Alone Atomic Force Microscope", Review of Scientific Instruments, Oct. 1993, pp. 2892-2897, vol. 64, No. 10, American Institute of Physics, New York.

* cited by examiner

*Primary Examiner*—Jack I Berman
*Assistant Examiner*—Meenakshi S Sahu
(74) *Attorney, Agent, or Firm*—Smith Patent Office

(57) ABSTRACT

The invention relates to an apparatus and a method for a scanning probe microscope, comprising a measuring assembly which includes a lateral shifting unit to displace a probe in a plane, a vertical shifting unit to displace the probe in a direction perpendicular to the plane, and a specimen support to receive a specimen. A condenser light path is formed through the measuring assembly so that the specimen support is located in the area of an end of the condenser light path.

22 Claims, 3 Drawing Sheets

APPARATUS AND METHOD FOR A SCANNING PROBE MICROSCOPE

CROSS REFERENCE TO RELATED APPLICATIONS

This application is a continuation application of U.S. patent application Ser. No. 10/490,442 filed on Sep. 22, 2004 now U.S. Pat. No. 7,022,985, which was the National Stage of International Application No. PCT/DE02/03688, filed on Sep. 24, 2002. The disclosures of U.S. patent application Ser. No. 10/490,442 and International Application No. PCT/DE02/03688 are hereby incorporated by reference.

BACKGROUND OF THE INVENTION

1. Field of the Invention

The invention concerns apparatus and methods for scanning probe microscopy (SPM).

Scanning force microscopy (SFM) (AFM—atomic force microscopy) is one form of scanning probe microscopy. An important field of application of scanning probe microscopy is the determination of the topography of a specimen surface with high lateral and vertical resolution. The term "lateral resolution" in this context refers to the resolution in a plane of the surface under examination. The direction perpendicular to this plane is called vertical direction. In vertical direction, the topography of the surface is determined by vertical resolution. In addition to the topology, other characteristics of a specimen to be examined can be measured, such as the elasticity or forces of adhesion. Also optical near field microscopes belong to the class of scanning probe microscopes (SNOM—scanning near field optical microscope).

To be able to undertake scanning probe microscopy, the spacing between a probe and the specimen to be examined must be adjustable and measurable very precisely. Probes used in connection with scanning probe microscopes, for instance, are measuring beams which are called cantilevers. A force between the cantilever and the specimen under examination is evaluated as a measurement parameter, especially in scanning force microscopes, a force which may be described, in the simplest case, by a Lenard-Jones potential.

There are several ways of detecting the force. In the simplest case, the excursion of the probe is measured. With scanning force microscopy, when using a cantilever, the probe typically is designed as a thin spring pole. Likewise known are measuring methods with which the cantilever is excited so as to oscillate. Then the damping of the amplitude of the resulting oscillation is controlled. What the known measuring methods have in common is that the interaction between the cantilever and the specimen under examination is measured. As used in the present context, the term "scanning probe microscopy" comprises all these methods and the respective microscopes which are made use of with them.

With one known measuring method, the force acting on the cantilever is detected by applying a light spot principle (light pointer). According to this principle, a measuring ray of light, especially a laser beam is directed at the cantilever, with focusing being provided, if desired. In response to bending of the cantilever, the light beam is reflected at a certain angle with respect to the direction of the incident light, either from the cantilever or from a structural member connected to the cantilever. The reflected light beam is directed at a photodiode which comprises a detector surface having at least two segments. A difference in the light signals received at the two segments is an indication that the measuring light beam is remote from a midposition between the two segments. The midposition is defined as being located where equal portions of the reflected light beam impinge on both segments. Bending of the cantilever provokes a change in the equal distribution of the reflected light beam across both segments. If it is desired, in addition, to detect torsion of the cantilever a photodiode having four segments may be used since that permits the position of the reflected light beam to be determined in two directions on the photodiode. Knowing a cantilever spring rate, the force between the cantilever and the specimen under examination can be determined based on the measurement of the bending of the cantilever.

With a scanning probe microscope, the cantilever may be made, for instance, of silicon. Materials, such as $SiN_3$ or diamond likewise may be used. Basically, the measuring method according to the light spot approach is independent of the material of which the cantilever or measuring tip is made.

When scanning the specimen with the help of the cantilever, usually the distance in vertical direction between the specimen and the cantilever must be adjusted accurately by means of relative movement between the specimen and the cantilever. In this manner, for example, a constant force ratio may be adjusted. Piezoelectric elements may be used to adjust the spacing. During a measurement, the cantilever at the same time carries out scanning-type motion in lateral direction with respect to the specimen. In principle, either the specimen or the cantilever may be moved. If it is the cantilever that moves this is referred to as a "stand-alone scanning probe microscope". However, the cantilever also might be moved laterally and the specimen to be examined might be moved vertically, or vice versa.

2. Discussion of the Related Art

Two approaches are known, at the present time, in connection with stand-alone scanning probe microscopes to implement the light spot principle. With one approach, all the components of the light spot are moved along in all three directions in space. In this case the light spot is independent of the cantilever movement and simply indicates bending of the cantilever. This kind of implementation is disadvantageous in that it requires various setting means for adjusting the light source which generates the measuring light rays. The complete mass of the resulting mechanical structure must be moved along, and a mechanical resonant frequency of the measuring system is greatly reduced, especially also in vertical direction. The mechanical structure altogether must be implemented in but little space.

With a second type of implementation, the cantilever alone is moved in all three directions in space. In this case, however, measures must be taken to make sure that the measuring light rays still impinge on the cantilever as it moves so as to be reflected from the same. Imaging of the reflected measuring light on the photodiode is not possible unless lateral tracking of the measuring light rays is provided, especially when measurements are made which require scanning of large areas by means of the cantilever. Various methods have been proposed for tracking the measuring light. These methods are successful in that the intensity of the reflected measuring light rays remains unchanged or is varied only a little as the cantilever is moved. If the cantilever does not bend the photodiode signal obtained due to the reflected measuring light rays is completely or almost completely constant.

However, this method has the disadvantage that the lateral tracking of the measuring light rays does not permit simultaneous correction of a vertical measuring error which also exists. A vertical measuring error occurs when the cantilever, rather than being oriented at right angles to the direction of incidence of the measuring light rays, is slightly inclined.

When making measurements with scanning probe microscopes it is frequently desired to also examine the specimen by transillumination using an optical microscope for a broader analysis. To accomplish that, the specimen must be illuminated by condenser light in order to obtain optimized results. But the implementations described above of the light spot principle with stand-alone scanning probe microscopes do not allow the probe to be examined by means of an optical microscope disposing of condenser illumination when the specimen is positioned on a specimen support (slide) so as to be measured by means of the scanning probe microscope.

SUMMARY OF THE INVENTION

It is, therefore, an object of the invention to provide an improved apparatus and an improved method for a scanning probe microscope permitting simultaneous examination of a specimen by means of scanning probe microscopy and optical microscopy based on condenser illumination.

The object is met, in accordance with the invention, by an apparatus as recited in independent claim 1 and a method as recited in independent claim 22.

An essential concept comprised by the invention especially is the design of a condenser light path traversing a measuring assembly for a scanning probe microscope. The measuring assembly comprises a lateral shifting means to displace a probe, embodied, for example, by a cantilever, in a plane, a vertical shifting means to displace the probe in a direction perpendicular to the plane, and a specimen support to receive a specimen to be examined. The specimen support is disposed in the area of an end of the condenser light path formed through the measuring assembly. The apparatus described makes it possible to examine a specimen, placed on a specimen support, both by scanning probe microscopy and by optical microscopy based on condenser illumination without the need to remove the specimen from the support between the different examinations. In particular, both measurements may be undertaken at the same time. The condenser light path defined through the measuring assembly permits the specimen on the specimen support to be illuminated by condenser light for the examination by means of the optical microscope. The definition of the condenser light path through the measuring assembly, on the one hand, permits the structural components needed for the scanning probe microscopic examination to be built in compact form and so as to provide a stable structure, whereby the scanning probe microscopic examinations can be performed with great precision. On the other hand, the condenser light may spread towards the specimen as is usual with optical microscopes, without suffering any deviation due to optical deflecting means. Thus it becomes possible to combine highly precise examination by scanning probe microscopy and optical microscopic measurement by means of an optical microscope, including condenser illumination.

Another advantage of the invention resides in the possibility offered by the condenser light path, namely to examine the specimen microscopically without irradiation by condenser light. To this end, light for examining the specimen is received microscopically, it spreads from the specimen along the condenser light path to a microscope. A vertical illumination microscope may be used for this kind of optical microscopic examination. Here the condenser light path is utilized as a kind of observation channel which is available also during the scanning probe microscopic examination of the specimen.

A convenient modification of the invention provides for the condenser light path to be formed substantially centrally through the measuring assembly. Thus it is guaranteed that the components of the measuring assembly may be placed as closely as possible to the condenser light path, which helps render the measuring assembly structure stable and resistant to oscillations.

In an advantageous embodiment of the invention the condenser light path may be devised so as to pass through the lateral shifting means. In a preferred embodiment of the invention any influence which the lateral shifting means might have on the condenser light path is prevented almost entirely by having the condenser light path extend through an opening in the lateral shifting means. The stability of the measuring assembly is improved in an advantageous embodiment of the invention in that the vertical shifting means is arranged next to the condenser light path.

A structure having optimized mechanical properties is achieved by a convenient further development of the invention according to which the vertical shifting means comprises a plurality of vertical shifting elements arranged around the condenser light path.

A convenient further development facilitates precise performing of the optical microscopic examination of a specimen due to the fact that the condenser light path extends substantially parallel to vertical axis. A further development may provide for the condenser light path to extend substantially parallel to the measuring light rays which are directed at the cantilever in the scanning probe microscopic examination.

A convenient modification of the invention makes sure that the condenser illumination can spread as usual with conventional optical microscopes, with the least possible obstruction, by configuring the condenser light path such that condenser light can spread shaped like a substantially conical condenser light cone towards the specimen support. To achieve that, the structural elements of the scanning probe microscope are designed in a way which enhances the conical spreading of the condenser light.

An advantageous embodiment of the invention contributes to the compact structure of the apparatus aimed at by the fact that the condenser light path is formed through a retaining member, the vertical shifting means being disposed on the retaining member and the retaining member being made, at least in part, of transparent material. A retaining member made of transparent material minimizes the influence which the retaining member has on the spreading of condenser light.

According to an advantageous further development of the invention the retaining member may be held by a frame member and the condenser light path be formed through an opening in the frame member. Various component parts of the scanning probe microscopic apparatus may be mounted on the frame member without obstructing the usual spreading of the condenser illumination.

Equidirectional incidence of the condenser illumination for optical microscopic examination and of the measuring light for the scanning probe examination is rendered possible by a convenient modification of the invention with which at least a section of an optical deflecting means is disposed in the range of the condenser light path for deflecting measuring light rays on the measuring beam.

The influence of the optical deflecting means on the spreading of the condenser light can be minimized according to an advantageous further development of the invention if at least said section of the optical deflecting means is made of transparent material.

The light incidence of condenser light and measuring light can be optimized conveniently by arranging the optical deflecting means substantially centrally with respect to the condenser light path.

A preferred embodiment of the invention provides for the probe to be fixed to another retaining member, at least a section of the other retaining member being disposed in the condenser light, and the at least one section of said other retaining member being made of transparent material. This is the best possible guaranty of establishing stable central positioning of the probe for the scanning probe microscopic examination.

The fixing of the other retaining member in such a way that the other retaining member will not obstruct the usual spreading of the condenser light is achieved, in a preferred further development of the invention, by fastening the other retaining member to another retaining member which is coupled to the vertical shifting means and has an opening to be traversed by the condenser light path.

BRIEF DESCRIPTION OF THE DRAWINGS

The invention will be explained in greater detail below with reference to embodiments.

DETAILED DESCRIPTION OF THE PREFERRED EMBODIMENTS

Figure 1:
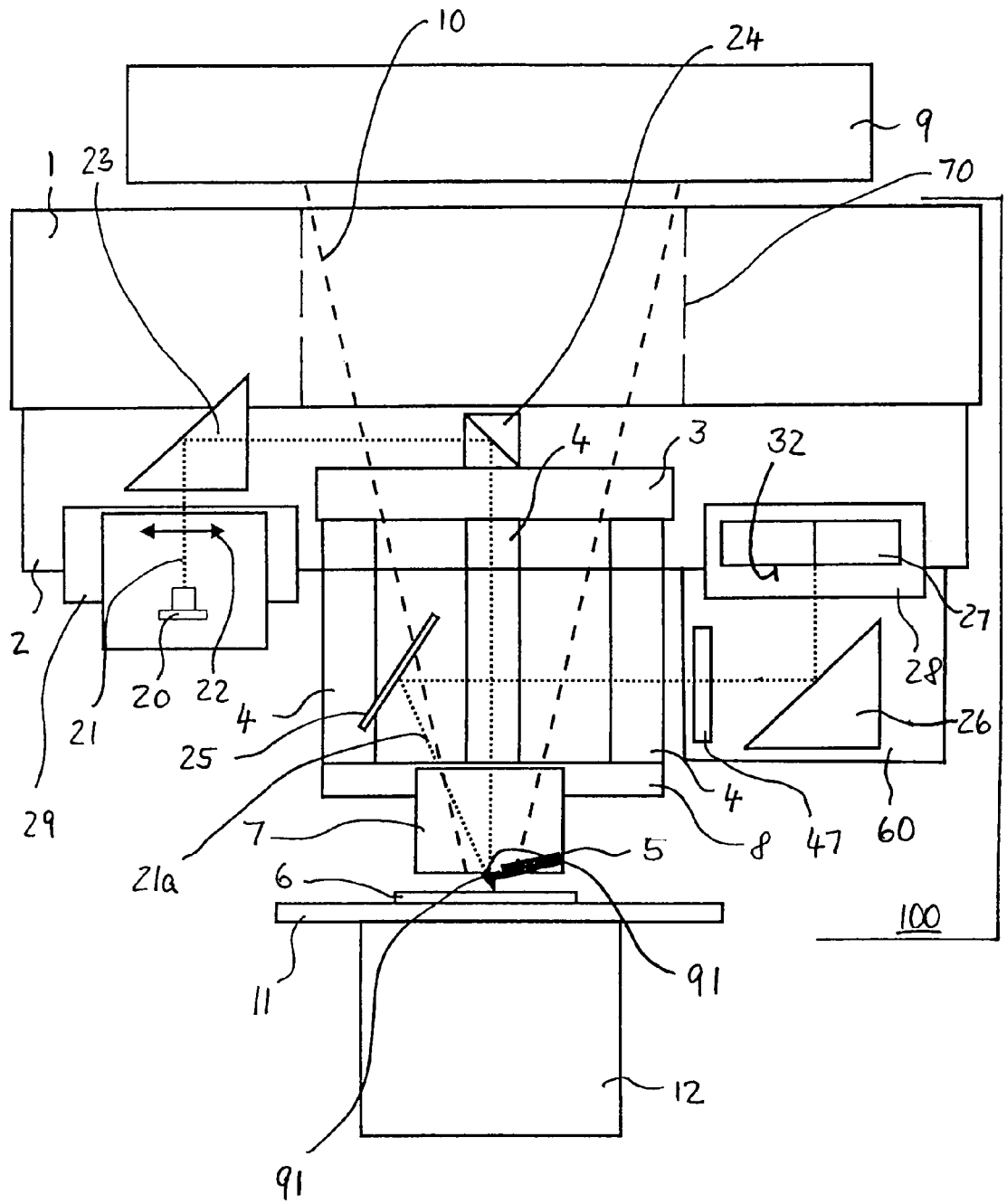
FIG. 1 is a diagrammatic illustration of a measuring assembly for a scanning probe microscope, comprising a transillumination microscope.

FIG. 1 diagrammatically shows a measuring assembly 100 for a scanning probe microscope, especially a scanning force microscope, comprising a lateral shifting unit 1 which permits precise movement of the other structural elements connected to the lateral shifting unit 1 in a plane extending vertically to the plane of the drawing in FIG. 1. The lateral shifting unit 1 may be composed, for example, of piezoelectric elements. In principle, however, any desired kind of apparatus may be used as long as they permit accurate displacement in a plane. A frame member 2 is mounted on the lateral shifting unit. Further structural members of the arrangement shown in FIG. 1 for a scanning probe microscope are fastened to the frame member 2 in a way so as to be movable in lateral direction with the aid of the lateral shifting unit 1.

A glass plate 3 is retained on the frame member 2. A plurality of vertical shifting units 4, preferably embodied by piezoelectric structural elements are mounted on the glass plate 3. The vertical shifting units 4 are arranged so as not to extend into the condenser light path 10, at least not so as to disturb it. Nevertheless the vertical shifting units 4 are placed as closely as possible to the condenser light path 10 so as to offer a high degree of stability.

Precise positioning of a probe 5 provided to carry out the scanning probe microscopic examinations, embodied by a so-called cantilever in the case of a scanning probe microscope, is accomplished in vertical direction, perpendicular to the lateral shifting plane, by the vertical shifting unit 4. That is required for adjusting and measuring the distance between the probe 5 and a specimen 6 with a high degree of precision. The probe 5 is mounted on a glass body 7 which in turn is coupled by an annular member 8 to the plurality of vertical shifting units 4. A defined transition from air to water must be given in order to render the measuring assembly 100 suitable also for applications under liquids. This is enabled by the glass body 7 which is dimensioned so as not to obstruct the condenser light path 10. The glass body 7 preferably is formed with a groove to permit the probe 5 to be installed at an inclination with respect to the plane of the specimen.

Condenser lighting 9 is provided above the measuring assembly 100 and above the lateral shifting unit 1 to generate condenser light. In FIG. 1, a condenser light path 10 has a conical configuration, as depicted in dashed lines. The condenser light path 10 extends substantially centrally through the lateral shifting unit 1, formed for this purpose with an opening 70, further through the glass plate 3, the annular member 8, and the glass body 7, thus illuminating the specimen 6 placed on a specimen support 11. The specimen support 11 may be a commercially available microscope slide or a Petri dish. The condenser lighting 9 serves for examining the specimen 6 with the aid of an objective 12 which is disposed underneath the specimen support 11.

The embodiment of the measuring assembly 100 illustrated in FIG. 1 for a scanning probe microscope thus permits the specimen 6 to be illuminated with condenser light even if the specimen 6 is disposed on the specimen support 11 for a scanning probe microscopic examination. The condenser light may spread in typical manner, for instance, conically along the condenser light path 10. To avoid any obstruction of the spreading of condenser light, those components of the arrangement according to FIG. 1 which are disposed in the range of the condenser light path 10 are provided, for example, with openings through which the condenser light may pass, or they are made of a material which is transparent to light, such as the glass plate 3 and the glass body 7. Deflection of the condenser light by means of additional optical elements on the way from the condenser lighting 9 to the specimen 6 is not required. Such optical deflections, as a rule, lead to reduced quality of the illumination of the specimen 6 for optical microscopic examination through the objective 12.

The specimen 6 may be subjected to a scanning probe microscopic examination by means of the measuring assembly 100 illustrated in FIG. 1. To that end, a light source 20, preferably embodied by a laser light source, generates measuring light rays 21 which are directed through a focusing lens 22, a prism 23, and a beam splitter 24 onto the probe 5. The size of the beam splitter 24 and its spacing from the specimen 6 are so selected that phase rings of the light from the condenser lighting 9, enabling the phase contrast, either pass by the beam splitter 24 on the outside or entirely through the beam splitter 24. The holder (i.e. the glass plate 3) of the beam splitter 24 is made of glass or another transparent material to let the light from the condenser lighting 9 travel completely undisturbed past the beam splitter 24. A different kind of retention might be provided, such as by a metal frame, but it would cause considerable disturbance of the condenser light path 10.

In accordance with the light spot principle, the measuring light rays 21 which are incident on the probe 5 are reflected, and the reflected measuring light rays 21a are guided via a deflection mirror 25 and another prism 26 to a photodiode 27. The photodiode 27 conveniently comprises a detector surface 32 having two segments. The distribution of the reflected measuring light rays 21a between the two segments of the detector surface of the photodiode 27 varies in response to the bending of the probe 5. The signals generated in the area of the two segments are a measure of the bending of the probe 5. The bending of the probe 5 in turn is the consequence of the interaction between the probe 5 and the specimen 6. This is the usual light spot measuring principle which is applied with scanning probe microscopes, especially scanning force microscopes and, therefore, will not described in greater detail here.

The photodiode 27 is mounted on the frame member 2 by means of an adjustment unit 28. The light source 20 and the focusing lens 22 are mounted similarly on the frame member 2 by means of another adjustment unit 29.

Figure 2:
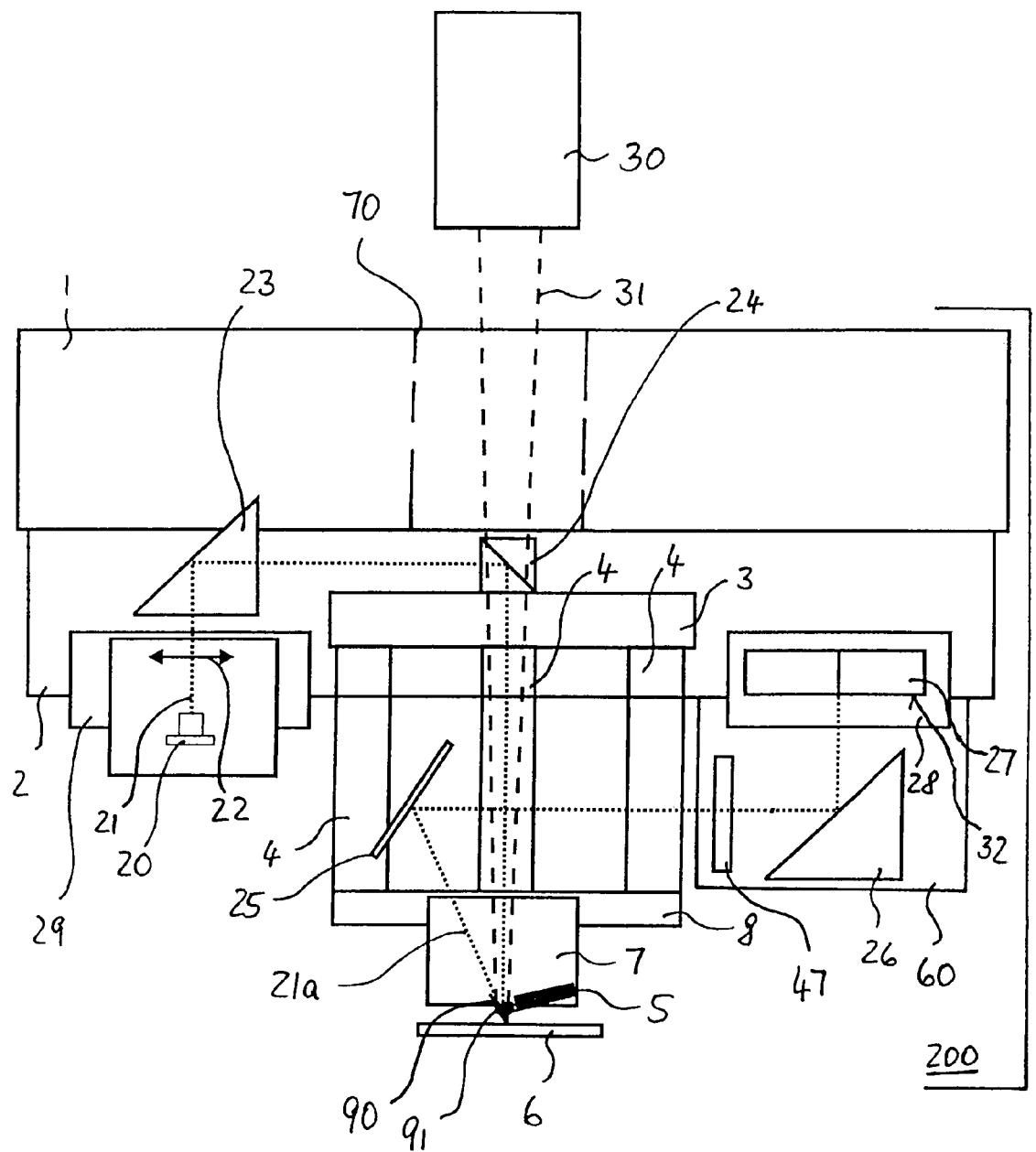
FIG. 2 is a diagrammatic illustration of the measuring assembly shown in FIG. 1, comprising a vertical illumination microscope.

FIG. 2 is a diagrammatic presentation of a measuring assembly 200 for a scanning probe microscope having the same features as the embodiment illustrated in FIG. 1. Other than in FIG. 1, however, a vertical illumination microscope 30 is provided for the optical microscopic examination of the specimen 6. The vertical illumination microscope 30 serves to collect light which is spreading from the specimen 6 through the measuring assembly 200 for the scanning probe microscopic examination to the vertical illumination microscope 30, along a condenser light path 31 which, in cross section, substantially has the shape of a cone section. As in FIG. 1, the course of the condenser light path 31 goes substantially centrally through the measuring assembly 200 shown in FIG. 2 and is designed to be sufficiently large, especially in cross section, so that light from a condenser (not shown in FIG. 2) may spread throughout the light path. When the specimen 6 is examined by means of the vertical illumination microscope 30 the condenser light path is utilized as a kind of observation channel or general light channel through which light may spread from the specimen 6 to the vertical illumination microscope 30. Upon deflection by the beam splitter 24, the measuring light rays 21 generated by the light source 20 propagate within the condenser light path 31 and substantially parallel to the condenser light path 31, as is the case with the embodiment shown in FIG. 1, too.

The total height of the measuring assemblies 100 and 200, respectively, is restricted because of the provision of the condenser light paths 10 and 31, respectively. At present, the maximum working distances for commercially available condensers lie in a range of approximately 70 mm. Part of the total height, inherently, is taken up by the shifting units 1 and 4, respectively. Consequently, it is a condition that elements applied for measuring according to the light spot principle must do with but little height overall so as to meet the requirement of a compact design of the measuring assemblies 100 and 200, respectively.

Some of the structural members located above the specimen 6 and the probe 5 are made transparent to define the condenser light paths 10 and 31, respectively. Thereby and due to the stand-alone principle, the courses of the measuring light rays 21 and of the reflected measuring light rays 21a are severely restricted. The elements which make up the light spot, especially the light source 20, the focusing lens 25, the other adjustment unit 29, the prism 23, the beam splitter 24, as well as the deflection mirror 25, the other prism 26, a correction lens 47, the adjustment unit 28, the photodiode 27, and the probe 5 itself or a reflection element 91 fixed to the probe 5 to reflect the incident measuring light rays 21 all are connected mechanically to the lateral shifting unit 1 and are moved together with the lateral shifting unit 1. As a consequence, these elements are at rest with respect to one another while the specimen 6 is being scanned. This eliminates the need for tracking of the measuring light rays 21 on the probe 5. Therefore, the correction units so far provided in the art may be dispensed with, correction units which, by the way, might disturb the spreading of light along the condenser light paths 10 and 31, respectively. In vertical direction, on the other hand, of all the light spot elements, it is only the probe 5 or the reflection element 91 fixed to the probe 5 to reflect the incident measuring light rays 21 which are displaced by means of the vertical shifting unit 4. This displacement of the probe 5 causes relative movement of the probe 5 with respect to the remainder of the light spot elements. A means of correcting that will be described in greater detail below with reference to FIG. 3.

Basically, there are two possibilities for the course of the measuring light rays reflected at the probe 5 not to obstruct the condenser light paths 10 and 31, respectively. One possibility is to orient the probe 5 in parallel with the plane of the specimen 6 and pass the reflected measuring light rays back along their incident path. The two paths of rays, i.e. that of the measuring light rays incident on the probe 5 and that of the measuring light rays reflected at the probe 5, may be separated outside of the range of the condenser light paths 10 and 31, respectively, and the reflected measuring light rays be directed to the photodiode. Separation may be effected, for instance, by distinguishing the polarization. This procedure is disadvantageous in that it is rather difficult to secure the probe 5 such that its tip will be the lowest point of the measuring assemblies 100 and 200, respectively. This is particularly difficult if the specimens to be analyzed have very rough surfaces. True, the probe 5, for instance, may be glued to a cantilever chip. But this solution requires cumbersome removal from the fixture when exchanging the probe 5, for example. The cantilever chip also might be adhered by way of a thin liquid film. But that solution is not very secure.

An alternative solution for not impairing the condenser light paths 10 and 31, respectively, is to install the probe 5 at an inclination with respect to the specimen 6 so that the reflected measuring light rays 21a will be deflected far enough out of the condenser light paths 10 and 31, respectively, (see FIGS. 1 and 2). Thus no other structural elements, like the photodiode 27 disturb the condenser light paths 10 and 31, respectively. However, tilting the probe 5 too far may give rise to problems because the likelihood of getting distorted measured values due to the tip geometry of the probe 5 becomes ever greater. Furthermore, it was found that a minor local disturbance of the path of rays in the condenser light paths 10 and 31, respectively, does not lead to any relevant loss of resolution of the optical image. In the presently preferred embodiment, therefore, the probe 5 is tilted only slightly and the reflected measuring light rays 21a are blanked out by means of the deflection mirror 25 which interferes only slightly with the condenser light paths 10 and 31, respectively.

The novel arrangement of the light spot elements offers an additional advantage over known methods of correcting the measuring light rays in measurements according to the light spot principle by means of stand-alone scanning probe microscopes. Correction in lateral direction is eliminated because all the light spot aggregates are moved together laterally and, therefore, are at rest with respect to one another. But correction still is required for distortions of measurement values caused by vertical movement of the probe 5 with respect to the remainder of the light spot elements. The origin of this distortion of measurement values is the parallel offset of the reflected measuring light rays 21a that is dependent on the vertical excursion of the probe 5.

Figure 3:
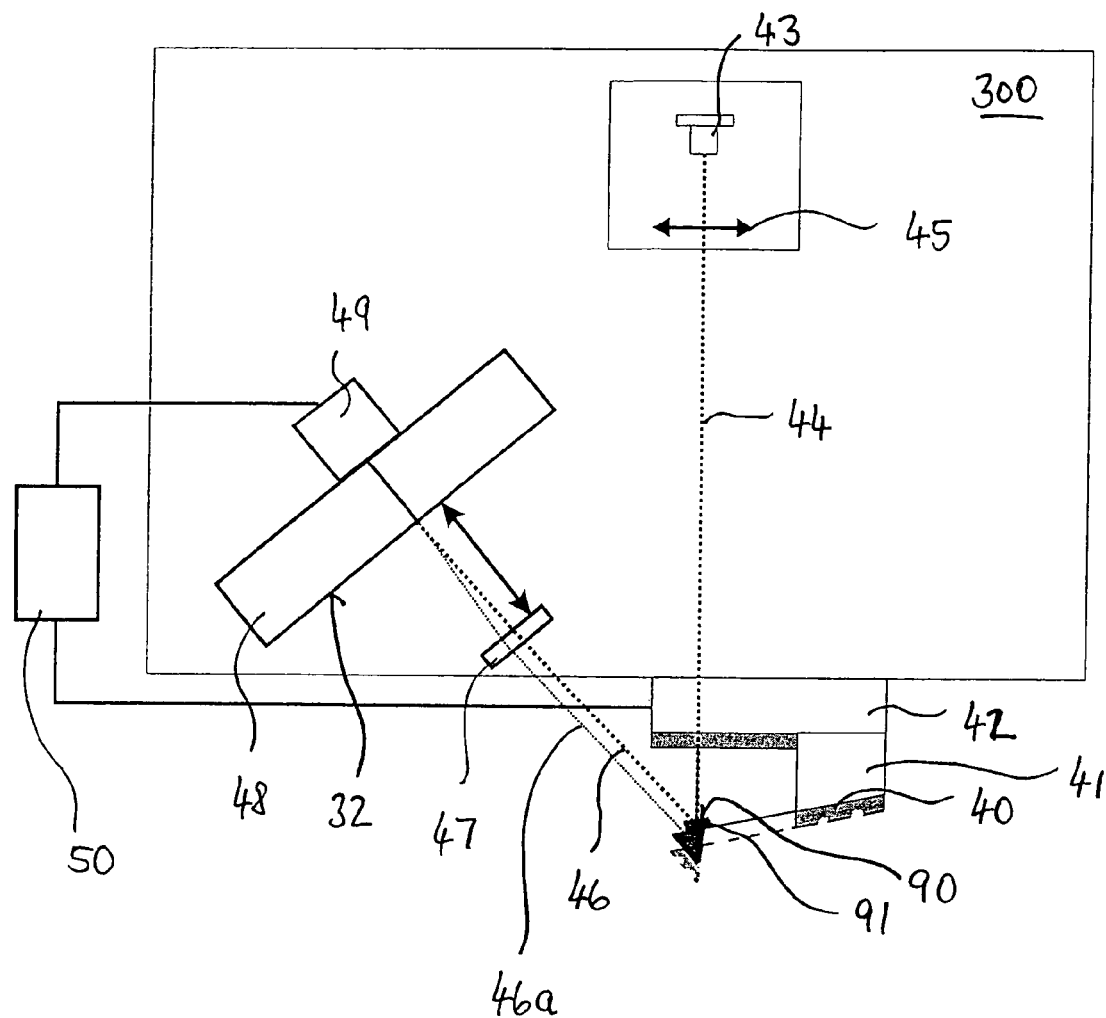
FIG. 3 is a diagrammatic illustration of another measuring assembly for a scanning probe microscope, comprising a correction lens system.

FIG. 3 is a diagrammatic presentation of a light spot apparatus 300 for a stand-alone scanning probe microscope, especially a scanning force microscope. As shown in FIG. 3, a probe 40 is connected by a fastening unit 41 to a vertical adjustment unit 42 which extends in z-direction. When performing measurements according to the light spot principle, the light spot apparatus 300, comprising the light source 43, a focusing lens 45, the correction lens 47, as well as the photodiode 48 and its associated circuitry 49 in the embodiment according to FIG. 3, is moved laterally as a whole together with the probe 40 and the fastening unit 41 as well as the vertical adjustment means. To this end, the light source 43, a focusing lens 45, the correction lens 47, the photodiode 48 and its circuitry 49 are connected mechanically to the lateral shifting unit (not shown in FIG. 3) of the scanning probe microscope, as described above with reference to the embodiments shown in FIGS. 1 and 2 which likewise comprise the correction mechanism including the correction lens 47 to be discussed below. The essential factor is that all the light spot aggregates, including the probe can be displaced together in lateral direction and that, in vertical direction, the probe is displaceable with respect to the other aggregates. The measurement errors potentially occurring here are corrected, as will be explained in detail below.

A measuring light ray 44 generated by means of a light source 43 and, having left the light source 43, first passes through a focusing lens 45, impinges on the probe 40, and is reflected on a reflection surface 90 of a reflection means 91, such as a mirror, whereby a reflected measuring light ray 46 is produced which passes through a correction lens 47 to reach a photodiode 48. The correction lens 47 is marked by the same reference numeral in FIGS. 1 to 3. The photodiode 48 comprises electronic circuitry 49 which serves to process the measurement signals received by means of the photodiode 48. The photodiode 48 is coupled by the electronic circuitry 49 to a control means 50 which in turn is connected to the vertical adjustment means 42. A controlled magnitude is generated with the assistance of the control means 50 in response to the measurement signals received from the photodiode 48 for readjustment of the vertical adjustment means 42. In this manner, the probe 40 is displaced vertically in z-direction, as illustrated in dashed lines in FIG. 3.

Vertical displacement of the probe 40 by the adjustment means 42 results in relative movement of the probe 40 with respect to other light spot elements. After the displacement, an altered, reflected measuring light ray 46a which is offset parallel to the reflected measuring light ray 46 enters the correction lens 47. The correction lens 47 directs the altered, reflected measuring light ray 46a into the same area of the detector surface of the photodiode 48 as the reflected measuring light ray 46. To be able to do that, the correction lens 47 is disposed at a distance 51 from the detector surface 32 of the photodiode 48 which distance substantially corresponds to the focal length of the correction lens 47. The correction lens 47 thus corrects the distortions of measured values described above which are caused by movement of the probe 40 in vertical direction or z-direction and, therefore, may also be referred to as a z-correction lens.

In the case of the embodiments shown in FIGS. 1 and 2, relative movement of the probe 5 with respect to other light spot elements is caused by actuation of the vertical shifting unit 4 because, from among the light spot elements, only the probe 5 is displaceable by the vertical shifting unit. The correction of errors thus caused is achieved by means of the correction lens 47 whose spacing from the detector surface of the photodiode 21 corresponds to the focal length of the correction lens and, therefore, any reflected measuring light rays 21a which may be offset in parallel will not distort the measurement result. On the other hand, particularly the correction lens 47 and the prism 26 which guide the reflected measuring light rays 21a onto the photodiode 27 are coupled by a fastening unit 60 to the lateral shifting unit 1 so as to be moved together with the photodiode 27 and the remainder of the light spot elements.

The features of the invention disclosed in the specification above, in the claims and drawing may be significant for implementing the invention in its various embodiments, both individually and in any combination.

What is claimed is:

1. An apparatus for a scanning probe microscope, comprising a measuring assembly which includes
    a lateral shifting unit for lateral displacement in a plane,
    a vertical shifting unit for vertical displacement perpendicular to the plane,
    a probe provided on a probe support and
    a specimen support to receive a specimen,
    the lateral shifting unit and the vertical shifting unit being operable to provide relative displacement between the specimen support and the probe support,
    wherein a condenser light path is, at least partially, formed through the measuring assembly between a condenser light source and the specimen support, and wherein the specimen support is located in the area of an end of the condenser light path.

2. The apparatus as claimed in claim 1, wherein the condenser light path is formed substantially centrally through the measuring assembly.

3. The apparatus as claimed in claim 1, wherein the condenser light path is formed, at least partially, through the lateral shifting unit.

4. The apparatus as claimed in claim 3, wherein the condenser light path is formed through an opening in the lateral shifting unit.

5. The apparatus as claimed in claim 1, wherein the vertical shifting unit is arranged adjacent to the condenser light path.

6. The apparatus as claimed in claim 5, wherein the vertical shifting unit comprises a plurality of vertical shifting elements which are arranged around the condenser light path.

7. The apparatus as claimed in claim 1, wherein the condenser light path extends substantially parallel to a vertical axis.

8. The apparatus as claimed in claim 1, wherein the condenser light path is formed so that condenser light is in the shape of a substantially conical condenser light cone towards the specimen support.

9. The apparatus as claimed in claim 1, wherein the condenser light path is formed through a retaining member, the vertical shifting unit being disposed on the retaining member and the retaining member being made, at least in part, of transparent material.

10. The apparatus as claimed in claim 9, wherein the retaining member is arranged substantially centrally with respect to the condenser light path.

11. The apparatus as claimed in claim 9, wherein the retaining member is held by a frame member, the condenser light path being formed through an opening in the frame member.

12. The apparatus as claimed in claim 9, wherein at least a section of an optical deflecting unit is disposed in the range of the condenser light path to deflect measuring light rays towards the probe.

13. The apparatus as claimed in claim 12, wherein at least said section of the optical deflecting unit is made of transparent material.

14. The apparatus as claimed in claim 12, wherein the optical deflecting unit is arranged substantially centrally with respect to the condenser light path.

15. The apparatus as claimed in claim 9, wherein the probe is fixed to another retaining member, at least one section of the another retaining member being disposed in the condenser light path and said at least one section of the another retaining member being made of transparent material.

16. The apparatus as claimed in claim 15, wherein the another retaining member is fixed to a further retaining member which is coupled to the vertical shifting unit and comprises an opening, the condenser light path being formed through the opening.

17. The apparatus as claimed in claim 1, wherein an optical examination unit is provided for optical examination of the specimen illuminated by condenser light.

18. The apparatus as claimed claim 17, wherein the optical exanimation unit is provided beneath the specimen support.

19. The apparatus as claimed in claim 17, wherein the optical examination unit is an objective.

20. The apparatus as claimed in claim 17, wherein the optical examination unit is an optical microscope.

21. The apparatus as claimed in claim 1, wherein for vertical displacement the probe support is connected to-the vertical shifting unit.

22. A method of microscopically examining a specimen on a specimen support of a scanning probe microscope, including an optical microscope, comprising the steps of:

providing a measuring assembly which includes a lateral shifting unit, a vertical shifting unit, a probe provided on a probe support and a specimen support to receive a specimen;

positioning a probe and the specimen support relative to each other using at least one of the lateral shifting unit for lateral displacement in a plane and the vertical shifting unit for vertical displacement perpendicular to the plane, to perform relative displacement between the probe support and the specimen support;

providing a condenser light and illuminating the specimen on the specimen support using light rays from the condenser light; and guiding the light rays from the condenser light along a path which is at least partially provided through the measuring assembly.

\* \* \* \* \*